Sept. 6, 1966   D. W. STEIGER ETAL   3,270,829
ARTICULATED VEHICLE
Filed Aug. 4 1964   3 Sheets-Sheet 1
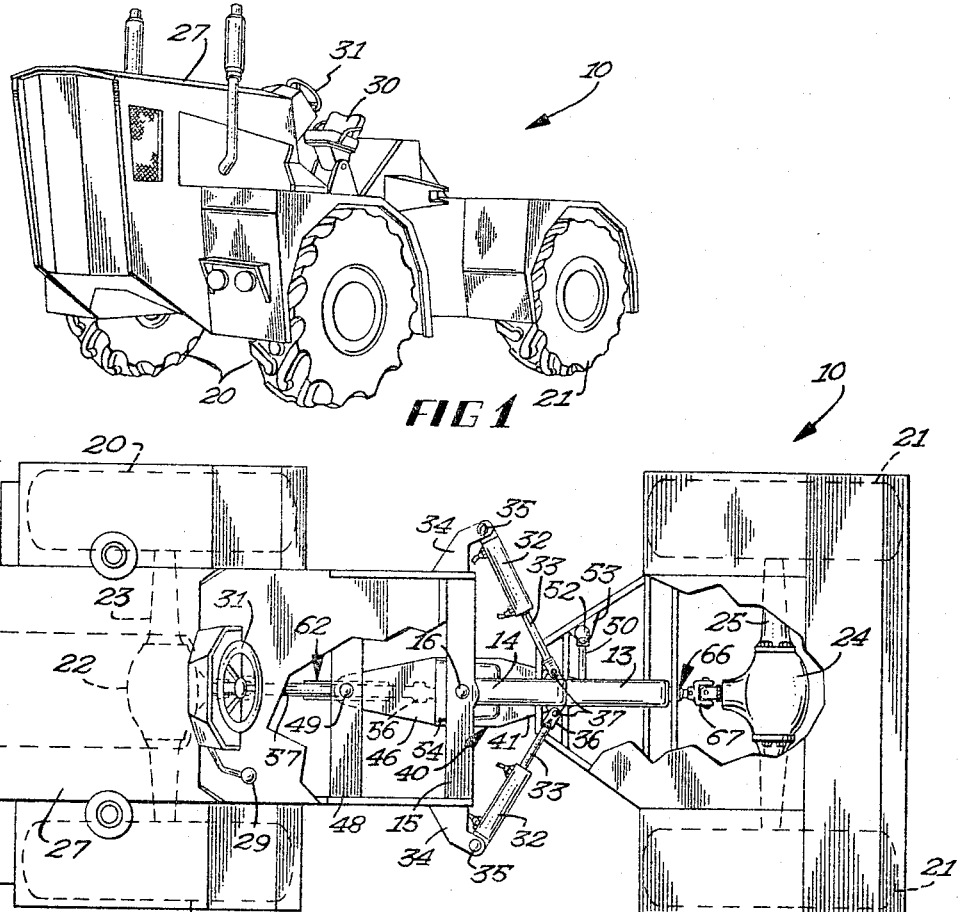
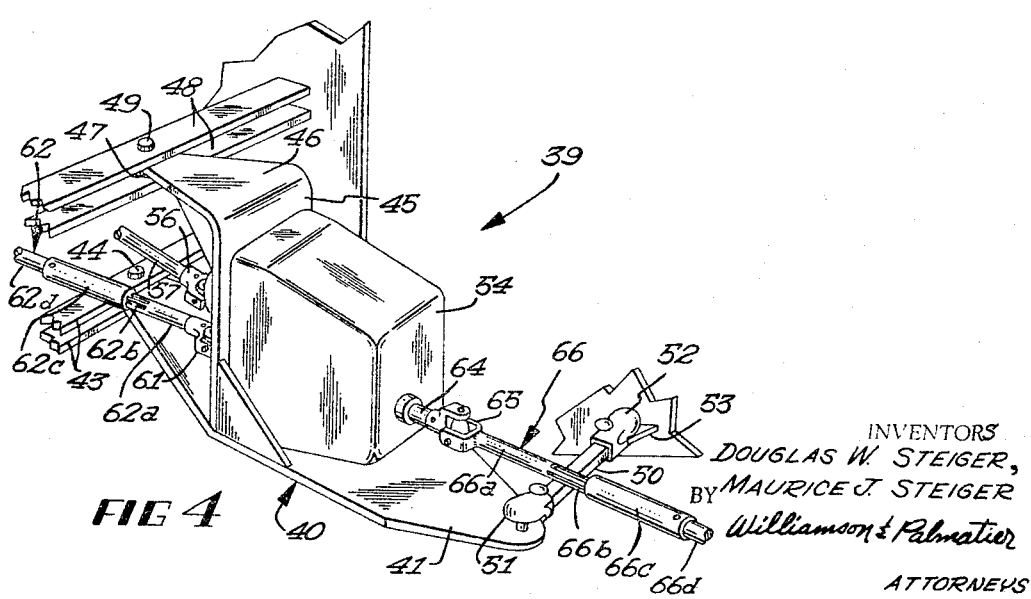
INVENTORS
DOUGLAS W. STEIGER,
BY MAURICE J. STEIGER
Williamson & Palmatier
ATTORNEYS

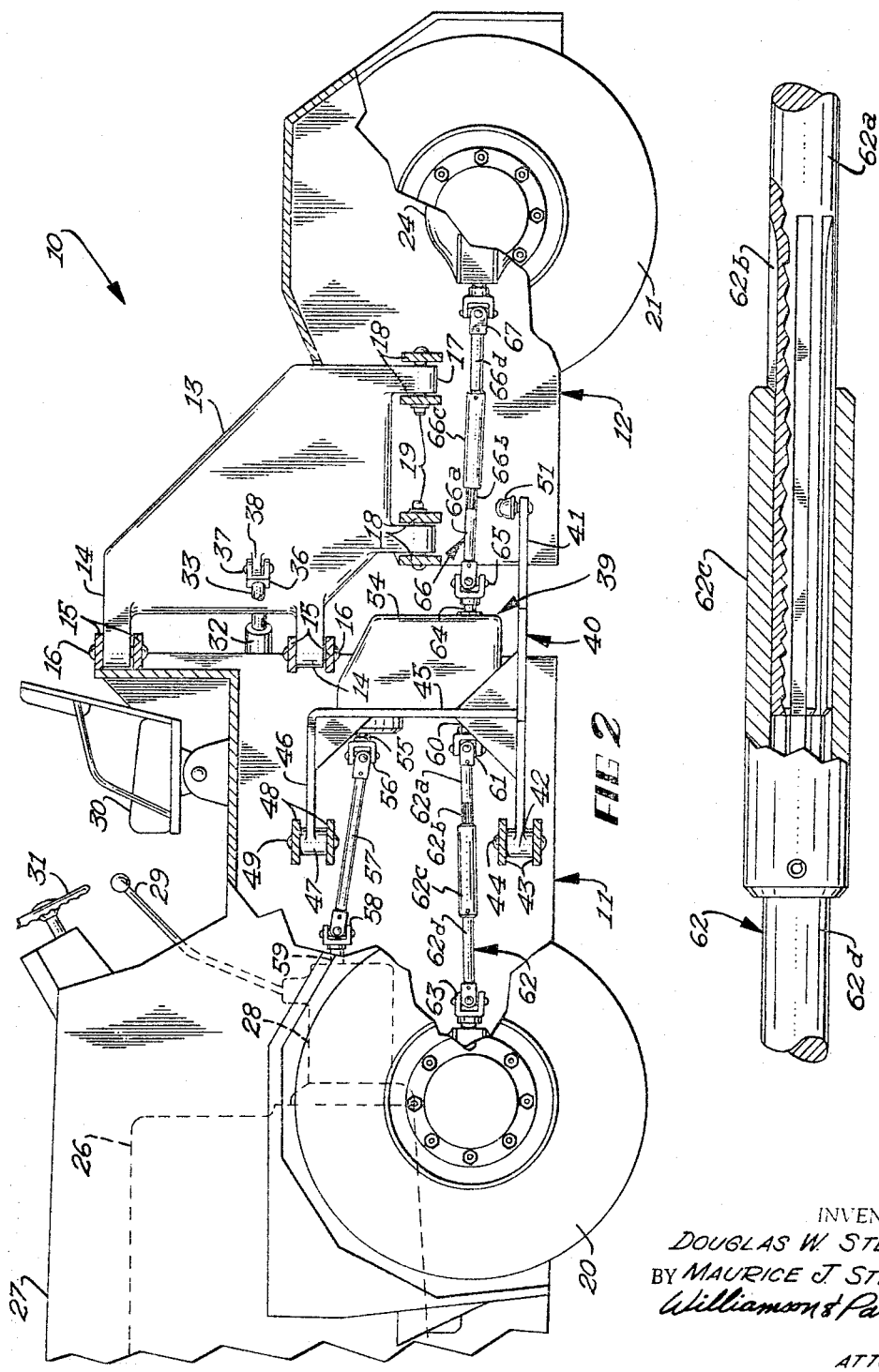

INVENTORS
DOUGLAS W. STEIGER,
BY MAURICE J. STEIGER

Williamson & Palmatier
ATTORNEYS

United States Patent Office 3,270,829
Patented Sept. 6, 1966

3,270,829
ARTICULATED VEHICLE
Douglas W. Steiger and Maurice J. Steiger, Red Lake Falls, Minn., assignors of one-half to Earl A. Christianson, Elbow Lake, Minn.
Filed Aug. 4, 1964, Ser. No. 387,391
9 Claims. (Cl. 180—51)

This invention relates to vehicles and more specifically to an articulated vehicle.

An object of this invention is to provide an articulated sectional vehicle having a unique articulated drive connection interposed in the drive shaft means which are connected to the front and rear ground engaging means and which is operative to permit sharp turns of the vehicle on relatively short radii without producing undesirable flexural stress in the articulated drive connection.

A more specific object of this invention is to provide a novel and improved articulated vehicle including front and rear frame structures interconnected together for pivotal movement about a substantially vertical axis and each having driven ground engaging means connected by suitable drive shaft means to the engine of the vehicle, and an articulated drive connection interposed in the drive shaft means including a coupling mechanism and support therefor, the latter being mounted for pivoting movement about vertical axes spaced longitudinally from the pivotal connection between the frame structures whereby the frame structures may pivot sharply relative to each other and thereby allow the vehicle to make sharp turns on a relatively short radius without creating undue stress on the articulated drive shaft means.

A further object of this invention is to provide an articulated vehicle, such as a tractor, including front and rear frame structures interconnected together by hinge means to permit relative pivoting movement therebetween about a substantially vertical axis, each of the frame structures having driven ground engaging wheels connected by elongate drive shafts to the engine of the vehicle, and an articulated drive connection including a support structure for supporting a drive coupling between the drive shaft means, the support structure being pivotally interrelated with the frame structures and permitting the drive shaft to be disposed diagonally of the pivotal axis between the frame structures during cornering or turning of the vehicle.

These and other objects and advantages of the invention will more fully appear from the following description made in connection with the accompanying drawings, wherein like character references refer to the same or similar parts throughout the several views, and in which:

FIG. 1 is a front perspective view of one embodiment of our invention;

FIG. 2 is a side elevational view thereof on an enlarged scale with certain parts thereof broken away for clarity;

FIG. 3 is a top plan view thereof with certain parts broken away for clarity;

FIG. 4 is a rear perspective view on an enlarged scale of the articulated drive connection incorporated in the novel tractor device;

FIG. 6 is a fragmentary side elevational view on an enlarged scale and with parts thereof broken away for clarity and illustrating one of the longitudinally adjustable drive shafts;

Figure 5:
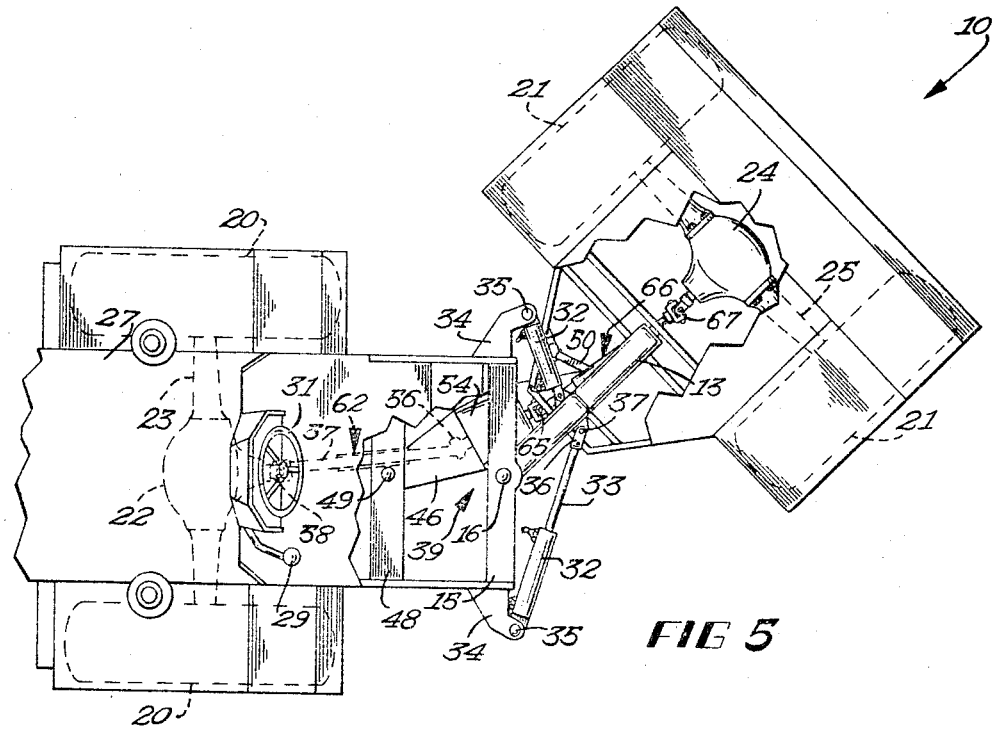
FIG. 5 is a top plan view similar to FIG. 3 but illustrating the front and rear frame structures of the vehicle in angulated relation with respect to each other and during a turning operation.

Referring now to the drawings, and more specifically to FIGS. 1 through 7, it will be seen that one embodiment of our novel articulated vehicle, designated generally by the reference numeral 10, is there shown. The vehicle 10 includes a front frame structure 11 and a rear frame structure 12 which are joined together for articulated swinging movement relative to each other about substantially vertical and horizontal axes. The means for swingably interconnecting the front and rear frame structures comprises a hinge member 13 which is provided with a pair of forwardly projecting vertically spaced-apart apertured ears 14 each of which project between a pair of transverse frame elements 15 which are rigidly secured to the front frame structure 11. It will be noted that the two pair of frame elements 15 are disposed in substantially parallel relation with respect to each other and suitable pivot pins 16 pivotally connect the ears 14 to these frame elements 15 adjacent the central portion thereof.

The hinge member 13 is also provided with a pair of longitudinally spaced-apart depending apertured ears 17 which are disposed in substantial longitudinal alignment with respect to each other. Each of the ears 17 is positioned between one of two pair of longitudinally spaced-apart transversely extending frame elements 18 which extend transversely of and are rigidly secured to the rear frame structure 12. The ears 17 are secured to the frame elements 18 by suitable pivot pins 19, as best seen in FIG. 2. Thus it will be seen that the front and rear frame structures are hingedly connected together for swinging movement relative to each other about a substantially vertically disposed axis defined by the vertically aligned pivot pins 16 and also for swinging movement about a longitudinal horizontal axis defined by the longitudinally aligned pivots 19.

The vehicle 10 is provided with four wheel drive and includes a front pair of driven ground engaging wheels 20 and a pair of rear ground engaging wheels 21. The front ground engaging wheels 20 are driven through a differential gearing mechanism 22 in a well known manner and the front wheel axle housing 23 is rigidly secured to the front frame structure 11. Similarly, the rear wheels 21 are also driven through a suitable differential gearing mechanism 24 in a well known manner and the rear axle housing 25 is rigidly secured to the rear frame structure 11. Since the axle housings for the front and rear propulsion wheels are rigidly secured to their respective frame structures, steering of the vehicle is accomplished by producing relative pivoting movement about the vertical axis defined by the articulated connection between the front and rear frame structures respectively.

The front frame structure is provided with a suitable internal combustion engine 26 which is mounted below the hood 27 of the vehicle and which is provided with a suitable transmission mechanism 28 of conventional construction, the latter being actuated by a suitable gear shift lever 29. It will be noted that the front frame structure is arranged and constructed to define a compartment or cab for an operator of the vehicle and which is provided with an operator's seat 30, as best seen in FIGS. 1 and 2. A steering wheel 31 is also provided to facilitate steering of the vehicle by the operator and which actuates means to produce relative pivoting movement between the front and rear frame structures.

The means for producing relative swinging movement between the front and rear frame structures 11 and 12 about the vertical axis comprises a pair of similar hydraulic rams each including a cylinder 32 and a piston rod 33 which is extensible and retractable relative to the cylinder 32. Each of the cylinders 32 is pivotally connected by a pivot pin 35 to one of a pair of brackets 34 which are rigidly secured to and project laterally and rearwardly from the sides of the front frame structure 11 adjacent the rear portion thereof. The bifurcated end 36 of each of the piston rods 33 is pivotally connected by a pivot pin 37 to one of a pair of ears 38 which are affixed to and project laterally outwardly from the hinge member 13.

The hydraulic rams are of the double acting type and are supplied with hydraulic fluid from a suitable reservoir preferably carried by the front frame structure 11. It will be seen that when the piston rod 33 of one hydraulic ram is extended, the piston rod of the other hydraulic ram is retracted thus producing relative swinging movement of the frame structures about the vertical axis. This extension and retraction of the hydraulic rams is produced in response to turning of the steering wheel 31 whereby when the wheel is turned to the right with respect to an operator seated in the seat 30 and facing forwardly, the hydraulic rams will be operated to produce pivoting movement between the frame structures so that the vehicle will negotiate a right turn. The amount of extension and retraction of the hydraulic ram will also be dependent upon the amount of angular displacement or revolving movement of the steering wheel 31. Therefore the operator may control the articulated vehicle with respect to turning in the same manner as conventional vehicles by operation of the steering wheel so that gradual as well as sharp or acute cornering or turning may be accomplished. Turning of the steering wheel actuates the hydraulic rams through suitable valving means (not shown).

The articulated vehicle 10 is driven by the front and rear pair of ground engaging or propulsion wheels 20 and 21 respectively from power supplied through suitable drive shafts from the source of power or engine 26. Since the drive to the front and rear pairs of wheels is obtained through the use of drive shafts, a unique articulated drive connection is provided which minimizes the flexural stress produced with respect to the drive shafts during cornering or turning of the vehicle. Thin articulated connection designated generally by the reference numeral 39 and illustrated in detail in FIGS. 2 and 4 includes a support structure or sub-frame 40 which is comprised of a substantially flat base plate 41 which is horizontally disposed and which extends between the front and rear frame structures, as best seen in FIGS. 2 and 4. The front end portion of the base plate 41 is provided with a vertically oriented sleeve element 42 which is positioned between a pair of vertically spaced-apart substantially parallel frame elements 43 that traverse and are rigidly secured to the front frame structure 11. A suitable pivot pin 44 pivotally connects the sleeve 42 to these frame elements 43 intermediate the ends thereof and substantially in the vertical longitudinal center line plane of the vehicle.

The base plate 41 has a vertically disposed bracket plate 45 rigidly secured thereto and projecting upwardly therefrom adjacent the front portion thereof and this bracket plate 45 is provided with a forwardly projecting attachment arm 46 which has a sleeve element 47 rigidly secured to the front portion thereof. This sleeve element is positioned between a pair of frame elements 48 which extend transversely of and are rigidly attached to the front frame structure 11 in vertically spaced relation with respect to the frame elements 43. A pivot pin 49 pivotally connects the sleeve element 47 to the frame elements 48 in substantially vertical alignment with the pivot 44 and it is pointed out that the pivots 16, 19, 44 and 49 are all disposed in the same vertical longitudinal center line plane of the vehicle.

The rear end portion of the base plate 41 is connected to one end of an elongate horizontally disposed stabilizer bar 50 by means of a ball and socket joint 51, as best seen in FIG. 4. The other end portion of the stabilizer bar 50 is connected by a ball and socket joint connection 52 to an ear 53 rigidly secured to the rear frame structure 12 adjacent the forward portion thereof. It will be noted that the horizontally disposed stabilizer bar 50 is disposed in substantial normal or right angular relationship to the general longitudinal axis of the vehicle 10 when the respective front and rear frames thereof are disposed in longitudinal alignment, as best seen in FIG. 3. This stabilizer bar 50 tends to stabilize the vertical pivotal axis between the front and rear frame structures in the absence of the force exerted by the hydraulic rams.

A transmission or gear box mechanism 54 is mounted on the vertical bracket plate 45 and the input shaft 55 thereof is connected by a suitable universal joint connection 56 to the rear end of a drive shaft 57. It will be noted that the drive shaft 57 is substantially horizontally disposed and is connected by a universal joint connection 58 to the output shaft 59 of the primary transmission mechanism 28, as best seen in FIG. 2.

The gear box mechanism 54 is provided with a front output shaft 60 which is connected by a suitable universal joint connection 61 to the rear end of the horizontally disposed front drive shaft 62. The front end of this front drive shaft 62 is connected by a suitable universal joint connection 63 to the input shaft of the front differential mechanism 22.

The gear box mechanism 54 is also provided with a rear output shaft 64 which is connected by a suitable universal joint connection 65 to the front end of a rear drive shaft 66 as best seen in FIG. 2. The rear end of the rear drive shaft 66 is connected by a universal joint connection 67 to the input shaft of the rear differential gear mechanism 24 whereby drive is supplied to both the front and rear pairs of ground engaging wheels.

Inasmuch as the front and rear ends of the front and rear drive shafts 62 and 66 respectively are connected to parts which pivot relative to each other during the turning operation of the vehicle, the front and rear drive shafts are constructed to extend and retract during this turning operation. To this end, it will be seen that the front drive shaft 62 includes a rear shaft element 62a which is splined as at 62b, as best seen in FIGS. 2, 4 and 6, and which is received within an internally splined sleeve 62c, the latter being pinned to the front shaft element 62d. With this arrangement, the shaft element 62b and sleeve 62c are capable of longitudinal displacement with respect to each other during the turning operation.

Similarly, the rear drive shaft 66 is of sectional construction and includes a shaft element 66a provided with suitable longitudinally extending splines 66b which are received within an internally splined sleeve 66c which in turn is pinned or secured to shaft element 66d. Thus the rear drive shaft 66 is also capable of longitudinal extension and retraction during the turning operation.

During operation of the vehicle 10, the engine 26 will provide the motive power for the front and rear pair of ground engaging or propulsion wheels 20 and 21 respectively. Let it be assumed that the vehicle 10 is traversing a straight course as indicated by the illustration of the vehicle in FIG. 3. It will be noted that the vertical pivotal axes defined by the pivot pin 16 is disposed in substantial vertical alignment with the pivot axis of the support structure 40 defined by the pivots 44 and 49. The hydraulic rams will also be disposed in the position and condition illustrated in FIG. 3, but if it is desirable to execute a right turn, the steering wheel is revolved to the right with respect to an operator facing forwardly and seated upon the seat 30.

This actuates the valve mechanism (not shown) which causes the hydraulic rams to produce the condition illustrated in FIG. 5 wherein one of the hydraulic rams is extended and the others are retracted. Thus the front and rear frame structures are pivoted relative to each other by means of the hinge connection and about the pivotal axis 16. It will be noted that since the front pivotal axis of the support structure 40 is located forwardly of the pivotal axis 16, and because of the co-action of the stabilizer bar with respect to the rear end of the support structure 40, the support structure is disposed in diagonal relation with respect to the hinge member 13 and is laterally offset with respect to the pivotal connection 16. Thus very little flexural stress is exerted on the front and rear drive shafts during this turning operation. It will be noted that the included angle between the flexed drive shafts will be less than that defined by the frame structures.

This particular arrangement allows a vehicle to execute very sharp turns on relatively short radii as compared to conventional vehicles. It will be noted that the vehicle may be returned to a straight course of travel from the position illustrated in FIG. 5 by turning the steering wheel in a counterclockwise direction with respect to a forwardly facing operator and the valving mechanism which the steering wheel controls will cause the hydraulic liquid to return the piston rods to the position and condition illustrated in FIG. 3. It will therefore be seen that the longitudinally spaced relationship of the pivotal connections of the support 40 with respect to the pivotal axis of the frame structures not only allows the vehicle to execute relatively sharp or acute turns on fairly short radii but no undue stress is produced on the drive shafts during these turning operations.

Figure 8:
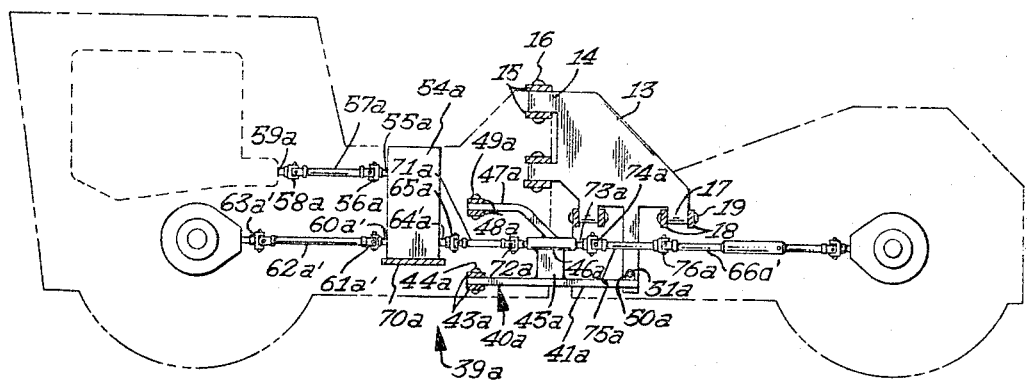
FIG. 8 is a side elevational view of a different embodiment of the articulated drive connection between the front and rear frame structures.
Figure 7:
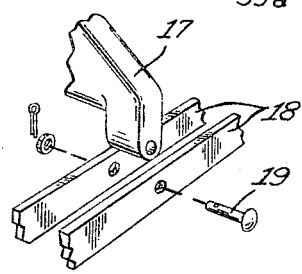
FIG. 7 is a rear perspective view on an enlarged scale illustrating details of the pivotal connection of the hinge means and the rear frame structure.

Referring now to FIG. 8 it will be seen that a modified form of the articulated drive connection is illustrated and since the remaining portions of the vehicle are similar in all other respects, the same reference numerals will be utilized with the exception of the articulated connection.

It will be seen in FIG. 8 that the articulated drive connection, designated generally by the reference numeral 39a, includes a support structure or sub-frame 40a comprised of a base plate 41a having an apertured front end. This apertured front end of base plate 41a projects through a pair of vertically spaced-apart substantially parallel frame elements 43a extending transversely of and secured to the front frame structure 11. A suitable pivot pin 44a pivotally connects the apertured front end of the base plate to the frame elements 43a in the manner of the embodiments of FIGS. 1 through 7. The base plate 41a is provided with a vertically disposed bracket plate 45a which has a longitudinally oriented horizontally disposed sleeve 46a secured to the upper end thereof. An elongate forwardly projecting attachment arm 47a is rigidly secured to the sleeve 4a and this arm has an apertured front end which projects between a pair of vertically spaced-apart substantially parallel frame elements 48a. A pivot pin 49a pivotally connects the arm 47a to the frame elements 48a, the pivot pin being disposed in substantially vertical alignment with the pivot pin 44a. It is pointed out that the pivot pins 44a and 49a are disposed in the same vertical longitudinal center line plane of the vehicle when the front and rear frame structures are arranged in longitudinal alignment as are the pivotal axes defined by the pivot pins 16 and 19.

The rear end portion of the base plate 41a is also connected to one end of an elongate horizontally disposed stabilizer bar 50a by means of ball and socket joint connection 51a. Although not shown, the other end portion of the stabilizer bar 50a is also connected by a ball and socket joint connection to an ear rigidly secured to the rear frame structure 12 adjacent the forward portion thereof. Similarly, the stabilizer bar is positioned in substantially normal relationship to the general longitudinal axis of the vehicle when the respective front and rear frames thereof are disposed in longitudinal alignment.

The transmission or gear box mechanism 54a is fixedly mounted on the front frame structure 11 by means of a bracket 70a. The input shaft 55a thereof is connected by a suitable universal joint 56a to the rear end of the main drive shaft 57a. The main drive shaft 57a is also connected by a universal joint connection 58a to the output shaft 59a of the primary transmission mechanism 28, as best seen in FIG. 2.

The front output shaft 60a' is connected by suitable universal joint connection 61a' to the rear end portion of the horizontally disposed front drive shaft 62a'. The front end of this front drive shaft 62a' is connected by a suitable universal joint connection 63a' to the input shaft of the front differential mechanism 22. Since the gear box mechanism 54a is fixed with respect to the front frame structure 11, it is unnecessary for the front drive shaft 62a' to be longitudinally extensible and retractable.

The gear box mechanism 54a is also provided with a rear output shaft 64a' which is connected by a suitable universal joint connection 65a to the front end of a front drive shaft section 71a. The rear end of the front drive shaft section 71a is connected by a universal joint 72a to an intermediate drive shaft section 73a which is journaled in the sleeve 46a. The rear end of this intermediate drive shaft section is connected by a universal joint connection 74a to a rear drive shaft section 75a, the latter being connected by a universal joint connection 76a to the rear drive shaft 66a' which is of sectional construction and capable of longitudinal extension and retraction in the manner of the embodiment illustrated in FIGS. 1 to 7. Thus the sectional jointed drive shaft including sections 71a, 73a and 75a permit substantial flexing of the drive between the front and rear frame structures even when the vehicle is negotiating a relatively sharp turn. Similarly, the pivotal connections of the support structure relative to vertical hinge connections between the frame structures allows the support structure 40a to swing relative to the frame structures.

This arrangement allows the included angle between the flexed drive shaft sections to be less than the angle defined between the articulated frame structures. Thus as in the embodiment of FIGS. 1 to 7 the articulated drive connection which extends between the front and rear pairs of ground engaging wheels is not subjected to flexural stress even when the vehicle is executing a relatively sharp or acute cornering operation. It has been found that our articulated vehicle can turn sharply on a much smaller radius than conventional tractors wherein the steering is accomplished by angling the wheels.

It will therefore be seen that we have provided a novel articulated vehicle which is especially adaptable for use in pulling heavy draft loads and is therefore ideally suited for agricultural, construction and other operations wherein substantial draft loads are produced by tools or trailing implements.

It will be noted that our novel articulated vehicle permits an operator to execute sharp turns on short radii thereby rendering our vehicle much more maneuverable than conventional prime mover vehicles such as tractors and the like.

Thus it will be seen that we have provided a novel articulated vehicle which is not only of simple and inexpensive construction but one which functions in a more efficient and economic manner than other comparable vehicles.

It will, of course, be understood that various changes may be made in the form, details, arrangement and proportions of the various parts without departing from the scope of our invention.

What is claimed is:

1. A power articulated vehicle comprising a front frame structure and a rear frame structure,
    means pivotally connecting said frame structures together for pivoting movement therebetween about a substantially vertical axis,
    each of said frame structures having driven ground engaging means for supporting the frame structures for travel over the ground, one of the frame structures having a source of power for driving said ground engaging means, drive transmitting means interconnected with the source of power and including a pair of elongate drive shafts each having one end thereof drivingly connected with said ground engaging means for one of said frame structures, said drive transmitting means including an articulated drive connection between said drive shafts comprising an elongate support structure pivotally connected with said front frame structure for pivotal movement about a substantially vertical axis located forwardly of said pivotal axis between said frame structures, said support structure being pivotally connected with said rear frame structure at a point located rearwardly of said pivotal axis between said frame structures, said articulated drive connection including a coupling mechanism mounted on said support structure and drivingly interconnecting said drive shafts, and power means extending between and connected to said frame structures for selectively causing relative pivotal movement between said frame structures.

2. A power articulated vehicle comprising a front frame structure and a rear frame structure, a hinge member extending between said frame structures and being pivotally connected to said rear frame structure for permitting relative pivoting movement therebetween about a substantially horizontal longitudinal axis, and being previously connected to said front frame structure for relative pivoting movement therebetween about a vertical axis, said pivotal axis being longitudinally spaced apart, each of said frame structures having driven ground engaging means for supporting the frame structures for travel over the ground, a source of power on one of said frame structures for driving said ground engaging means, drive transmitting means having drive connections with the source of power and including a pair of elongate drive shafts each having one end thereof drivingly connected with said ground engaging means for one of said frame structures, said drive transmitting means including an articulated drive connection between said drive shafts comprising a support structure pivotally connected with said front frame structure for pivotal movement relative thereto about a substantially vertical axis located forwardly of the vertical pivotal axis between said frame structures, and being pivotally connected with said rear frame structure at a point located rearwardly of said vertical pivotal axis between said frame structures, said articulated drive connection including a coupling mechanism mounted on said support structure drivingly interconnecting said drive shafts, and power means extending between and connected to said frame structures for selectively causing relative pivotal movement between said frame structures about the vertical pivotal axis therebetween.

3. The vehicle as defined in claim 1 wherein at least one of said drive shafts is arranged and constructed for longitudinal extension and retraction during relative pivoting movement of said frame structures about the vertical pivotal axis therebetween.

4. The vehicle as defined in claim 1 wherein said means for producing relative pivotal movement between said frame structures comprises a fluid pressure piston and cylinder actuator pivotally connected to said frame structures and being extensible and retractable to cause pivotal movement of said frame structures about the vertical pivotal axis thereof.

5. An articulated vehicle comprising a front frame structure and a rear frame structure, hinge means hingedly connecting said frame structures together and permitting relative pivoting movement therebetween about a substantially horizontal longitudinal axis and a vertical axis, said pivotal axis being longitudinally spaced apart, each of said frame structures having a pair of ground engaging wheels for supporting the frame structures for travel over the ground, a source of power one of said frame structures for driving the ground engaging wheels, drive transmitting means having drive connections with the source of power and including a pair of elongate drive shafts each having one end thereof drivingly connected with said ground engaging wheels of one of said frame structures, said drive transmitting means including an articulated drive connection between said drive shafts comprising an elongate support structure pivotally connected with said front frame structure for pivotal movement relative thereto about a substantially vertical axis located forwardly of the vertical pivotal axis between said frame structures, and being pivotally connected to said rear frame structure at a point located rearwardly of said vertical pivotal axis between said frame structures, said articulated drive connection including a coupling mechanism mounted on said support structure and comprising elongate coupling shaft means drivingly interconnecting said drive shafts, and power means extending between and connected to said frame structures for selectively producing relative pivotal movement between said frame structures about the vertical pivotal axis therebetween.

6. An articulated vehicle comprising a front frame structure and a rear frame structure, hinge means hingedly connecting said frame structures together and permitting relative pivoting movement therebetween about a substantially vertical axis and about a substantially horizontal longitudinal axis spaced longitudinally from said vertical axis, each of said frame structures having a pair of driven ground engaging wheels for supporting the frame structures for travel over the ground, a source of power on one of said frame structures for driving said ground engaging wheels, drive transmitting means having drive connections with said source of power and including a pair of longitudinally extending elongate drive shafts each having one end thereof drivingly connected with said ground engaging wheels of one of said frame structures, said drive transmitting means including an articulated drive connection between said drive shafts comprising a support structure extending between and pivotally connected with said front and rear frame structures for pivotal movement relative thereto about longitudinally spaced-apart substantially vertically disposed axes, each spaced from said vertical axis of pivot between said frame structures, said articulated drive connection including a coupling mechanism mounted on said support structure drivingly interconnecting said drive shafts, and actuator means extending between and connected to said frame structures for selectively causing relative pivotal movement between said frame structures about the vertical pivotal axis therebetween.

7. The vehicle as defined in claim 6 wherein said actuator means comprises a pair of spaced-apart fluid pressure piston and cylinder units.

8. The vehicle as defined in claim 6 wherein said drive shafts are each comprised of a plurality of interconnected sections capable of longitudinal extension and retraction during relative pivoting movement between said frame structures about the vertical pivotal axis therebetween.

9. The vehicle as defined in claim 6 wherein the vertical pivotal axis between said frame structures and the pivotal axis between said support structure and said front frame structure are disposed in the general longitudinal vertical center line plane of the vehicle.

References Cited by the Examiner

UNITED STATES PATENTS

| | | | |
|---|---|---|---|
| 1,391,011 | 9/1921 | Schneider | 180—50 |
| 2,827,715 | 3/1958 | Wagner. | |
| 2,835,397 | 5/1958 | Wagner. | |
| 3,157,239 | 11/1964 | Bernotas | 180—51 |
| 3,167,147 | 1/1965 | Symons et al. | 180—51 |

FOREIGN PATENTS 701,036  12/1964  Canada.

A. HARRY LEVY, *Primary Examiner.*